United States Patent [19]

Van Gestel

[11] Patent Number: 5,245,483
[45] Date of Patent: Sep. 14, 1993

[54] ARRANGEMENT FOR RECORDING CLOCK RUN-IN CODEWORDS AT THE BEGINNING OF A TRACK ON A MAGNETIC RECORD CARRIER

[75] Inventor: Wilhelmus J. Van Gestel, Eindhoven, Netherlands

[73] Assignee: U.S. Philips Corporation, New York, N.Y.

[21] Appl. No.: 711,483

[22] Filed: Jun. 6, 1991

[30] Foreign Application Priority Data

Dec. 21, 1990 [NL] Netherlands ............... 9002839

[51] Int. Cl.⁵ .............................................. G11B 5/09
[52] U.S. Cl. ............................... 360/40; 360/48; 375/19
[58] Field of Search ............ 360/40, 39, 48, 46, 360/65, 67, 119; 307/409, 269; 341/55, 50, 102, 103, 59; 375/19

[56] References Cited

U.S. PATENT DOCUMENTS

| | | | |
|---|---|---|---|
| 4,390,801 | 6/1983 | Kurata et al. | 307/409 |
| 4,851,837 | 7/1989 | Baldwin | 341/55 |
| 4,855,742 | 8/1989 | Verboom | 341/102 |
| 5,128,811 | 7/1992 | Van Gestel | 360/46 |
| 5,136,436 | 8/1992 | Kahlman | 360/40 |
| 5,142,421 | 8/1992 | Kahlman et al. | 360/40 |

Primary Examiner—Robert J. Pascal
Assistant Examiner—Ali Neyzari
Attorney, Agent, or Firm—Edward W. Goodman

[57] ABSTRACT

In a helical scan recorder, a sequence of n-bit first codewords ($W_1$) and n-bit second codewords ($W_2$) if any, are stored in second track parts (TP2) which form the beginning of the tracks ($T_1, T_2 \ldots$), these codewords having a form so that both a PR1 detection and a PR4 detection is possible on reproduction. The second codewords are the inverses of the first codewords. An optional form of the first codeword may be: 00011100011100000111100011.

11 Claims, 8 Drawing Sheets

ARRANGEMENT FOR RECORDING CLOCK RUN-IN CODEWORDS AT THE BEGINNING OF A TRACK ON A MAGNETIC RECORD CARRIER

BACKGROUND OF THE INVENTION

1. Field Of The Invention

The invention relates to an arrangement for recording a digital signal, for example, a digital video signal, in tracks on a magnetic record carrier, which tracks run parallel with each other over the record carrier and at an angle relative to the longitudinal axis of this record carrier, while the digital signal is recorded in a first track part of the tracks, which arrangement comprises an input terminal for receiving the digital signal and includes a recording means for recording the digital signal in the first track part.

2. Description Of The Related Art

An arrangement of this type is known, for example, from the publication entitled "A study on detection methods of NRZ recording" by S. Nakagawa et al. in IEEE Transactions on Magnetics, Vol. MAG 16, No. 1, January 1980, pp. 104–110. A digital signal in the form of a digital video signal is discussed in above publication.

When the video signals recorded on the record carrier with the aid of the arrangement are read out, it is important that when the reading of a track is commenced, the bit clock in the signal that has been read out, is locked on to in the best and fastest way possible in dependence on the detection method used for reading.

SUMMARY OF THE INVENTION

It is an object of the invention to provide an arrangement which is capable of locking on to the bit clock in a robust manner, which bit clock is present in the information read out from the beginning of the tracks.

Thereto, the arrangement according to the invention is characterized in that the arrangement comprises codeword generating means devised for generating n-bit first codewords, and in that the recording means is devised for recording the n-bit first codewords in second track parts which form the beginning of the tracks, in that the first codewords each contain a sequence of, successively, p bits having a first binary value, q bits having a second binary value being the inverse binary value of the first binary value, and r bits having the first binary value, and in that p, q and r are odd integers for which the following holds $p \geq 3$, $q \geq 3$, and $r \geq 3$.

The invention is based on the understanding that such a signal pattern is to be recorded in the second track parts at the beginning of the tracks so that the requirement is fulfilled that the signal pattern recorded in the second track parts be such that both if a class I partial response detection is used on reproduction and also if a class IV partial response detection is used, it is possible to lock on to the clock of the signal read from the second track parts.

The class I partial response detection (PR1) is extensively discussed in the aforesaid publication by Nakagawa, and is also referenced amplitude detection of NRZ recording or amplitude detection of NRZI recording. In the class I partial response detection method, the detection is based on Nyquist 1 filtering where there is no intersymbol interference at the clock instants. The clock instants are then derived from the maximums in the read-out signal (after Nyquist 1 filtering).

The class IV partial response detection (PR4) is also described in the aforesaid article. In the class IV partial response detection, the bandwidth is smaller than the bandwidth of the Nyquist 1 filter. Intersymbol interference does occur. This intersymbol interference is restricted, however, to the two adjacent bits. The clock instants are derived from the zero crossings of the signal that has been read out.

For a further description of the PR1 and PR4 detection methods reference be made to European Patent Application No. 317 013 (PHN 12,328), corresponding to U.S. patent application Ser. No. 271,139, filed Nov. 14, 1988, now U.S. Pat. No. 5,128,811.

The reason for enabling a PRo1 as well as a PR4 detection is found in the fact that one wishes to establish at a very early stage a signal format with which a digital (video) signal can be recorded on a magnetic record carrier, that is to say, at an instant at which it is not yet known which type of detection method will be used for the reproduction. Manufacturers of reproduction apparatus will then have options how to realize the clock extraction in their reproduction apparatus.

By forming, in accordance with the invention, the first codeword from at least a sequence of p "zeros", q "ones" and r "zeros", or rather q "ones", p "zeros" and r "ones", both a PR1 and a PR4 detection of the sequence is made possible so that a proper bit clock extraction from the signals obtained by means of the two detection methods is possible.

By including in the second block sections first n-bit-long codewords, there is the possibility to lock on to the word clock so that the positions of synchronization (sync) words occurring later in the read-out signal can be forecast so as to simplify the detection of these sync words.

In addition, the arrangement may be characterized, in that the arrangement is furthermore devised for generating n-bit second codewords and for recording the second codewords in the second track parts, and in that the second codewords are the inverse codewords of the first codewords.

This makes it possible to include additional pilot signals in the information to be recorded, which enable tracking when the information is reproduced. An arrangement capable of providing this feature is characterized in that for generating a pilot signal in the information recorded in the second track parts, which pilot signal consists of a carrier having a relatively low frequency with respect to the recorded information, the arrangement is devised for recording the first codewords and the second codewords in alternating sessions in the second track parts so that the mean value of the recorded information essentially varies according to the variation of the relatively low-frequency carrier, and in that for this purpose the disparity of the first and second codewords is unequal to zero.

Tracking is necessary for properly positioning the read head relative to the track to be read out during reproduction. Thereto, the information words forming the (video) signal which are to be recorded in the tracks are coded into channel words in such a way that a pilot signal is included in the serial data stream of the channel words, which pilot signal is used during reproduction to derive a tracking control signal by which the position of the read head relative to the track to be read out can be influenced. This pilot signal is realized in known fashion in that the current digital sum value in the serial data stream of the channel words to be recorded shows a behavior according to a desired pattern plotted against time, that is to say, for example in the form of a sine of a square wave.

Examples of affixing a pilot signal by influencing the current digital sum value of a digital channel signal to be recorded, are described, for example, in European Patent Application No. 339,724 (PHN 12,553), corresponding to U.S. patent application Ser. No. 337,242, filed Apr. 13, 1989, now U.S. Pat. No. 5,136,436, or Dutch Patent Application No. 90.02.772 (PHN 13,537), corresponding to U.S. patent application Ser. No. 712,167, filed Jun. 6, 1991, now U.S. Pat. No. 5,142,421.

By assigning according to the invention a disparity equal to a to the first codeword, where a is an integer unequal to zero, and assigning a disparity equal to -a to the second codeword, it will be possible to include a pilot signal in the digital information to be recorded, that is to say, to include the first and second codewords in such a way that the current digital sum value in the digital information to be recorded in the second track parts plotted against time shows a behavior according to the desired pattern of the pilot signal.

The first and second codewords (if present) may be in the form of 25-bit digital words. Dutch Patent Application No. 90.02.772 (PHN 13.537) describes the recording of 25-bit channel words on a magnetic record carrier. Video information is concerned there included in 24-bit information words to which a 1-bit digital word is affixed to obtain 25-bit information words. These 25-bit information words are then encoded to 25-bit channel words in a 2T precoder, after which these channel words are recorded in the first track parts of the tracks on the record carrier. The first (and possibly second codewords) as described hereinbefore, are affixed to the serial data stream of the channel words after the 2T precoder.

BRIEF DESCRIPTION OF THE DRAWINGS

The invention will be further explained by means of a number of embodiments with reference to the following drawings, in which.

DESCRIPTION OF THE PREFERRED EMBODIMENT

The FIGS. 1a–1d, 2a–2c, 3a–3c, 4a–4c and 5a–5c describe the operation of the PR1 detection method and the PR4 detection method for five digital signals.

Figures 1A, 1B:
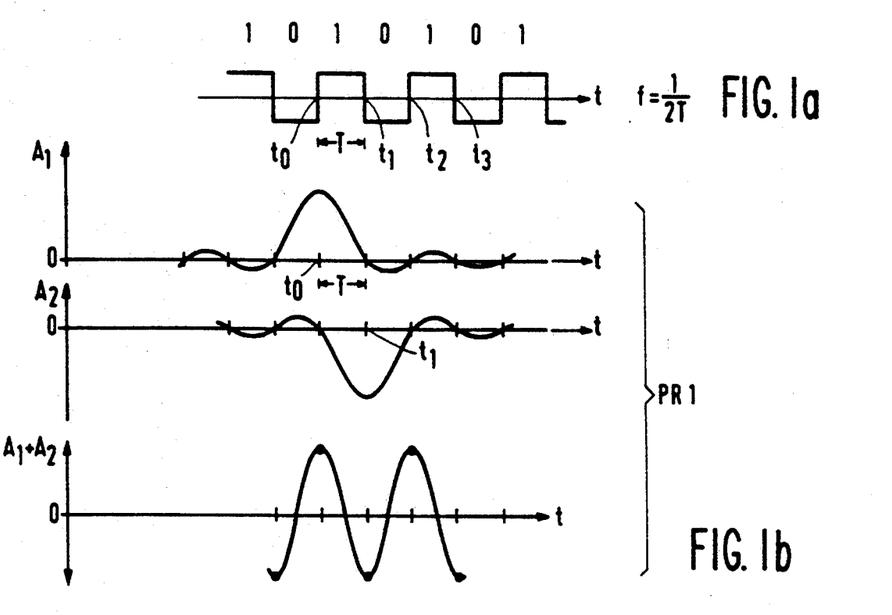
FIGS. 1a–1d, 2a–2c, 3a–3c, 4a–4c and 5a–5c show the PR1 and PR4 detection methods for a number of digital signals.

FIG. 1a shows a digital input signal to be recorded in a track on a magnetic record carrier. The digital signal is formed by alternating "zeros" and "ones". The clock frequency in the digital signal is equal to $\frac{1}{T}$. The reading of the signal of FIG. 1a by means of the PR1 detection will be described with reference to FIG. 1b and the reading of the signal of FIG. 1a by means of the PR4 detection, with reference to FIG. 1c.

FIG. 1b shows, in the time signal $A_1$, the response (i.e. the resulting signal read out with PR1 detection) to the ascending edge at instant $t=t_0$ in the signal of FIG. 1a.

The clock instants in the curve $A_1$ are located in time at the maximum of the curve and at the instants of the zero crossings in the curve. These clock instants are represented along the time axis in FIG. 1b and are time intervals T apart. The maximum in the curve $A_1$ at instant $t_0$ coincides in time with the ascending edge at instant $t_0$ in the signal in FIG. 1a.

The time signal $A_2$ is the response to the descending edge at instant $t=t_1=t_0+T$ in the signal of FIG. 1a. The maximum in the curve $A_2$ coincides in time with the descending edge at $t=t_1$ of the signal of FIG. 1a. The ascending edge at instant $t=t_2=t_0+2T$ of the signal of FIG. 1a again results in the curve $A_1$ shifted to the right by a time interval of 2T. The descending edge at instant $t=t_3=t_1+2T$ in the signal of FIG. 1a results in curve $A_2$ which is also shifted to the right by a time interval of 2T.

The overall response or (i.e. the readout signal which is the result of) the signal of FIG. 1a is the sum of the responses $A_1$ and $A_2$ and the shifted responses $A_1$ and $A_2$. This produces the curve represented in FIG. 1b with $A_1+A_2$. The clock instants now coincide with the instants at which the signal $A_1+A_2$ shows its maximum. The clock extraction, when employing PR1 detection, which is based on detecting the maximums in the readout signal as observed hereinbefore, can readily be realized. In addition, there is no intersymbol interference.

Figure 1C:
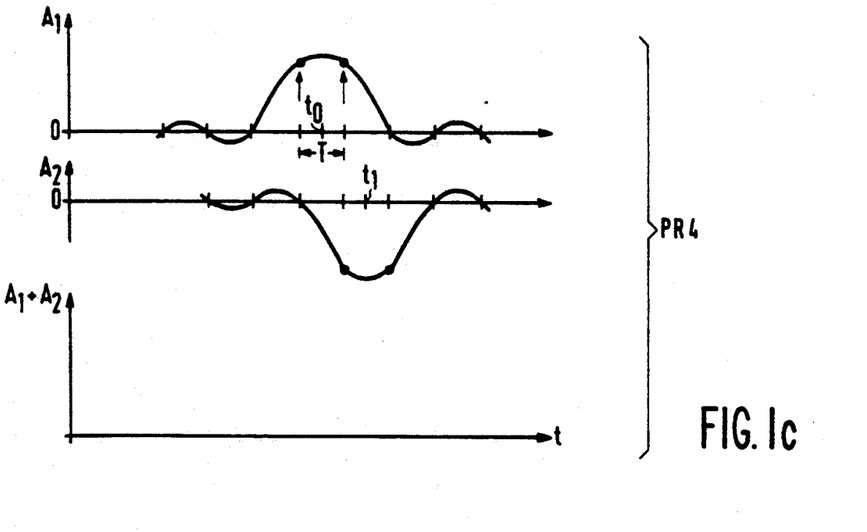

FIG. 1c shows, in time signal $A_1$, the response (that is to say, the resulting signal read out with PR4 detection) to the ascending edge at the instant $t=t_0$ in the signal of FIG. 1a. The maximum of the curve $A_1$ in FIG. 1c coincides in time with the ascending edge at the instant $t=t_0$ in the signal of FIG. 1a. The clock instants in the curve $A_1$ are again time intervals T apart, but are shifted by a time interval $T/2$ relative to the clock instants in the curve $A_1$ in FIG. 1b. This implies that around the maximum, there are two clock instants at which the curve $A_1$ is non-zero, whereas at the other clock instants, the curve $A_1$ is zero indeed. The above shows that there is intersymbol interference between two adjacent bits.

The time signal $A_2$ in FIG. 1c is the response to the descending edge at the instant $t=t_0=t_0+T$ in the signal of FIG. 1a. The maximum in the curve $A_2$ again occurs on the descending edge.

The ascending edge at the instant $t=t_2=t_0+2T$ in the signal of FIG. 1a again results in the curve $A_1$, shifted to the right by a time interval of 2T. The descending edge at the instant $t=t_3=t_1+2T$ in the signal of FIG. 1a again results in the curve $A_1$, shifted to the right by a time interval of 2T. The descending edge at the instant $t=t_3=t_1+2T$ in the signal of FIG. 1a again results in the curve $A_2$ shifted to the right by a time interval of 2T.

Figure 1D:
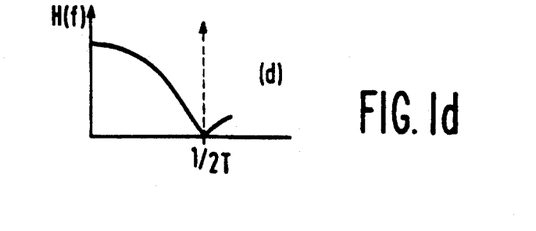

The overall response (that is to say, the resulting signal read out with PR4 detection) to the signal of FIG. 1a is the sum of the responses $A_1$ and $A_2$ and all shifted responses $A_1$ and $A_2$. This produces a zero signal as represented in FIG. 1c by way of time signal $A_1+A_2$. This also becomes evident if the frequency resonse $H(f)$ of the PR4 detection as represented in FIG. 1d is taken into account. This frequency response $H(f)$ has a zero at $f=\frac{1}{2}T$. The signal of FIG. 1a having a frequency of $f=\frac{1}{2}T$, is thus not detectable by means of PR4 detection.

Figures 2A, 2B:
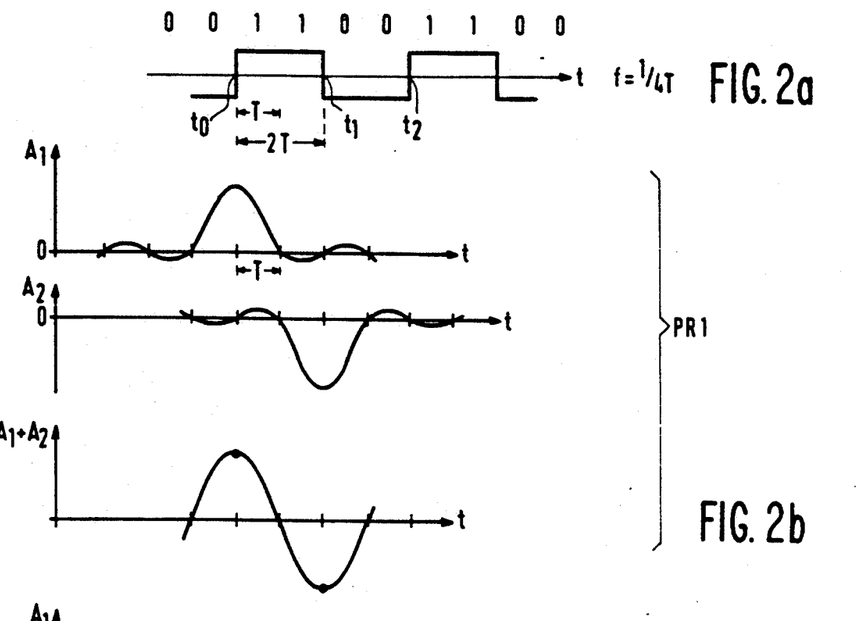

FIG. 2a represents the digital input signal which is recorded in a track on a magnetic record carrier. The digital signal is formed by two alternating pairs of "zeros" and "ones". The bit clock in this signal is again equal to T. The signal has a frequency f equal to $\frac{1}{4}T$.

Analogous to the preceding description, the ascendig edge at instant $t=t_0$ in the signal of FIG. 2a after PR1 detection produces the time interval $A_1$ represented in FIG. 2b. The curve $A_1$ in FIG. 2b is again the same as the curve $A_1$ in FIG. 1b. The descending edge at the instant $t=t_1$ in the signal of FIG. 2a after PR1 detection produces the time signal $A_2$ shown in FIG. 2b. The curve $A_2$ in FIG. 2b is identical with the curve $A_2$ in FIG. 1b.

FIG. 2b shows, in the curve $A_1+A_2$, the overall response after PR1 detection to the signal of FIG. 2a. Half the clock instants coincide with the maximums in this time signal as appears from the time signal $A_1+A_2$ in FIG. 2b. The clock extraction, when the PR1 detection is employed, can thus readily be realized.

Figure 2C:
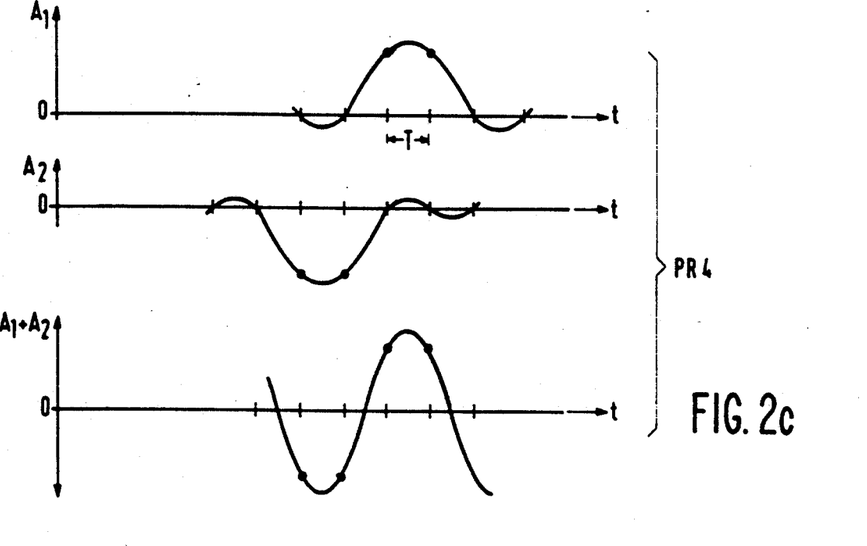

Furthermore, similar to the preceding description, the ascending edge at the instant $t=t_2$ in the signal of FIG. 2a produces, after PR4 detection, the time signal $A_1$ shown in FIG. 2c. The curve $A_1$ in FIG. 2c is again identical with the curve $A_1$ in FIG. 1c. The descending edge at the instant $t=t_1$ in the signal of FIG. 2a produces, after PR4 detection, the time signal $A_2$ shown in FIG. 2c. The curve $A_2$ in FIG. 2c is the same as the curve $A_2$ in FIG. 1c.

FIG. 2c shows, in the time signal $A_1+A_2$, the overall response, after PR4 detection, to the signal of FIG. 2a. As already observed hereinbefore the clock extraction with PR4 detection is effected by means of zero crossing detection in the signal $A_1+A_2$. The zero crossing in this signal, however, do not coincide in time with the clock instants. This implies that a good bit clock extraction is difficult.

Figures 3A, 3B:
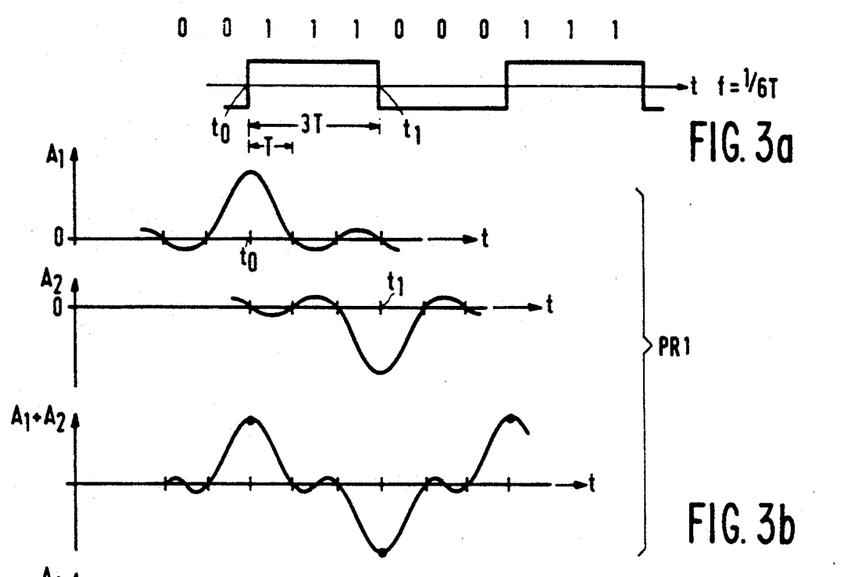

FIG. 3a shows the digital input signal recorded in a track on a magnetic record carrier. The input signal is formed by alternating sets of three "ones" and three "zeros". The bit clock in the signal is equal to T. The signal has a frequency equal to $1/6T$.

FIG. 3b shows, in the time signal $A_1$, the response, after PR1 detection, to the ascending edge at the instant $t=t_0$ in the signal shown in FIG. 3a. The time signal $A_2$ shows the response, after PR1 detection, to the descending edge at the instant $t=t_1$. The overall response, after PR1 detection, to the signal shown in FIG. 3a is represented in FIG. 3b by means of the time signal $A_1+A_2$. Distinctly shown is the fact that the maximums in the time signal coincide in time with the clock instants so that a proper clock extraction is possible.

Figure 3C:
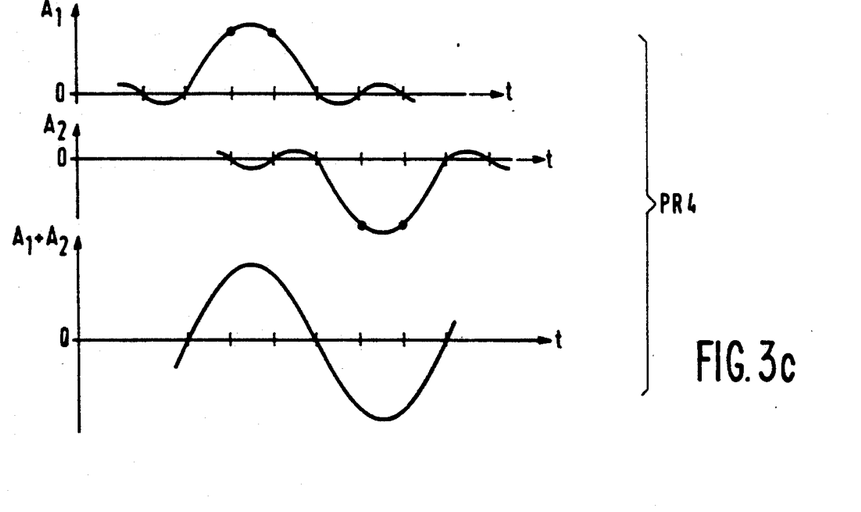

The signal $A_1$ in FIG. 3c represents the response, after PR4 detection, to the ascending edge at the instant $t=t_0$. The signal $A_2$ represents the response after PR4 detection to the descending edge at the instant $t=t_1$. The signal $A_1+A_2$ in FIG. 3c represents the overall response, after PR4 detection, again to the signal shown in FIG. 3a. Clearly noticeable is the fact that the "zeros" in the signal $A_1+A_2$ coincide in time with the clock instants, so that a proper bit clock extraction is again possible.

This means that both with PR1 detection and with PR4 detection the bit clock extraction from the signal shown in FIGS. 3a–3c is possible.

Figures 4A, 4B:
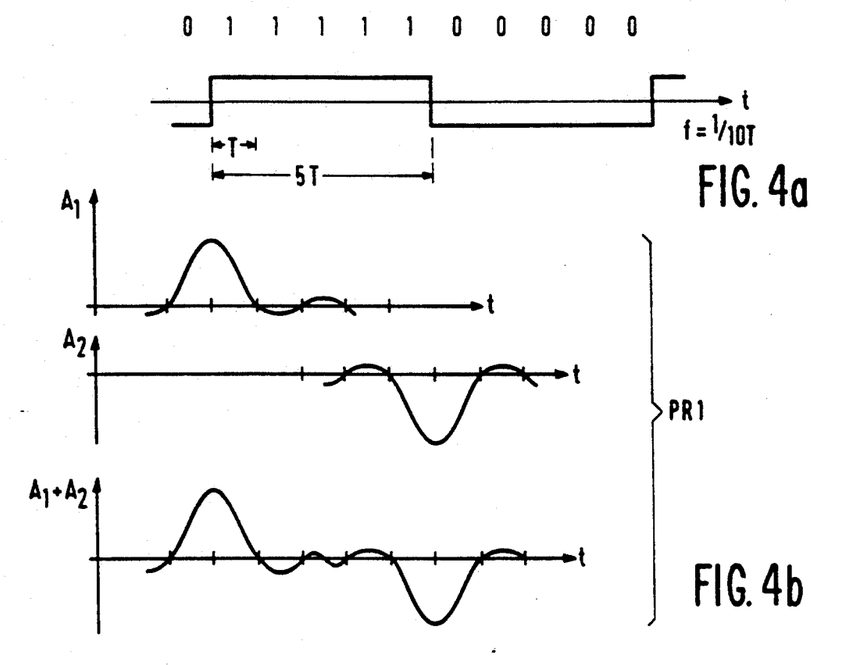
Figure 4C:
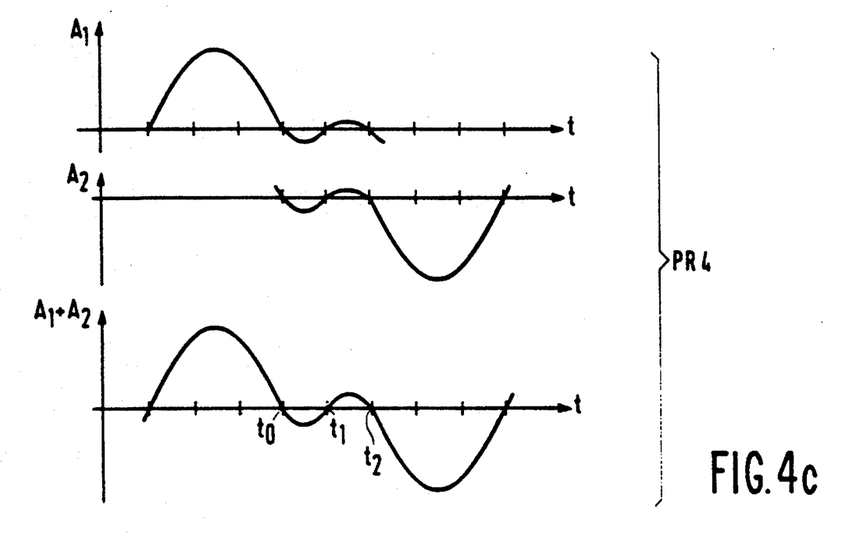

FIGS. 4a–4c show the PR1 detection (FIG. 4b) and the PR4 detection (FIG. 4c) of the signal of FIG. 4a, which is recorded in the track on the magnetic record carrier. The signal alternately comprises five "ones" and five "zeros".

FIG. 4b distinctly shows, the signal $A_1+A_2$, which represents the overall response, after PR1 detection, to the signal of FIG. 4a, that the maximum in this signal coincide with the clock instants so that a proper clock extraction is possible. In the signal $A_1+A_2$ of FIG. 4c, i.e. the overall response after PR4 detection, the zero crossings continue to coincide with the clock instants. Thus, also in this case it holds that a proper bit clock extraction is possible for both detection methods.

In curve $A_1+A_2$ in FIG. 4c, the fact is that the zero crossing at instant $t_0$ denotes a transition from a signal having a large absolute maximum in a positive direction to a signal having a small relative maximum in negative direction, and that the zero crossing at the instant $t_2$ denotes a transition from a signal having a small relative maximum in positive direction to a signal having a large absolute maximum in negative direction. The relative maximums (in negative direction between the instants $t_0$ and $t_1$, and in positive direction between the instants $t_1$ and $t_2$) are still so large as to make a proper detection of the zero crossings possible.

Figures 5A, 5B:
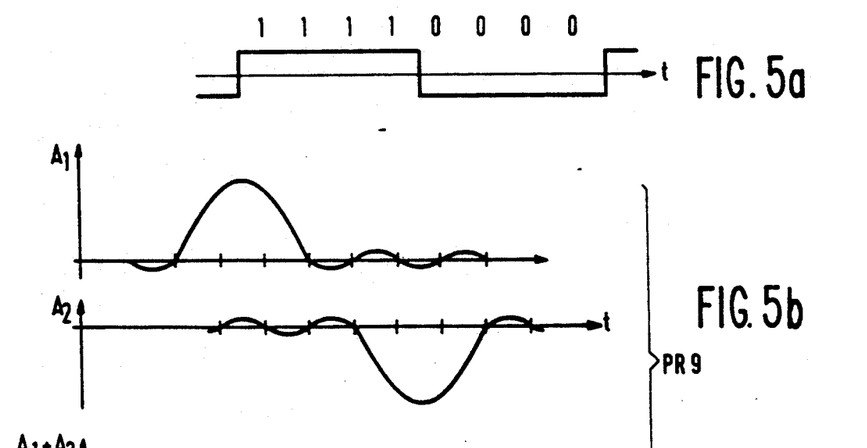
Figure 5C:
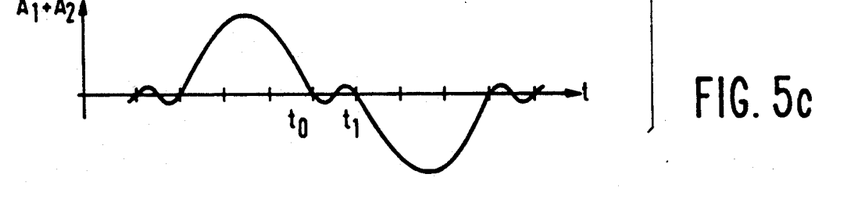

FIGS. 5a–5b show only the PR4 detection of a signal having an alternation of four "zeros" and four "ones" as is shown in FIG. 5a. The overall response $A_1+A_2$ in FIG. 5b distinctly shows that between the zero crossings which coincide with the clock instants such as $t_0$ and $t_1$, there is another zero crossing located halfway between them. The result is that the relative extremes in the curve $A_1+A_2$ and located between $t=t_0$ and $t=t_1$ are so small as to render a proper detection of the zero crossings impossible.

The same holds for the PR4 detection of a signal formed by an alternation of p "zeros" and p "ones", where p is an even number greater than or equal to 6. In addition, if there are many "ones" and "zeros" after each other, the transitions in the signal to be recorded are wider apart and, consequently, the clock extraction after PR1 or PR4 detection is rendered more difficult. This implies that even for the case where p is an odd number much greater than 5, the clock extraction after PR1 or PR4 detection is rendered more difficult, if not impossible.

Figure 6:
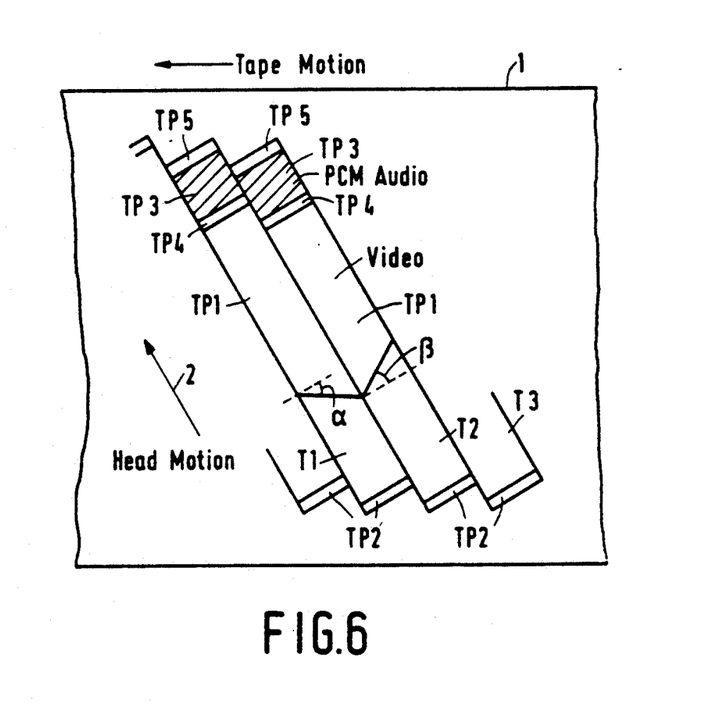
FIG. 6 shows the track pattern as obtained with the arrangement according to the invention.

FIG. 6 shows in a diagram a magnetic record carrier 1 on which a digital video signal and a digital audio signal are recorded in tracks $T_1$, $T_2$, . . . arranged at an angle with the longitudinal axis of the record carrier. The tracks are read out by means of read heads (not shown) moving over the tracks in the direction as indicated by means of the arrow 2. In first track parts TP1 of the tracks, the digital video information is stored. Second track parts TP2, forming the beginning of the tracks, precede the first track parts TP1.

The digital audio information, for example, a PCM audio signal, is stored in third track parts TP3 shown as shaded sections. The first track parts TP1 and the third track parts TP3 are separated by fourth track parts TP4, otherwise termed edit gaps. The tracks are terminated by fifth track parts TP5.

Two tracks, such as $T_1$ and $T_2$ can consecutively be recorded by two separate heads, one head at an azimuth angle $\alpha$ and the other head at an azimuth angle $\beta$. The heads are then positioned, for example, over 180° around the circumference of a rotatable head drum, while the record carrier is wrapped around the head drum over 180°. During a half revolution of the head drum, a track such as $T_1$ is recorded by one of the two heads, and during the subsequent half revolution of the head drum, the track $T_2$ is recorded by the other head. Alternatively, it is possible to have a united action of the two heads. In that case they are close together on the circumference of the head drum and are mechanically rigidly connected to each other. In a single scan of the record carrier by the combined heads, the tracks $T_1$ and $T_2$ are recorded simultaneously.

In a 50 Hz system with 625 video lines per picture, the information stored in a single video frame is equal to a single video picture stored in the first track parts TP1 of 12 consecutive tracks. In a 60 Hz system with 525 lines per picture the information stored in a single video frame is stored in the first track parts TP1 of 10 consecutive tracks.

For recording two audio channels in the third track parts, the third track parts of 6 consecutive tracks per video frame are available in the 50 Hz system. For the 60 Hz system, they are the third track parts of 5 consecutive tracks per video frame.

Figure 7:
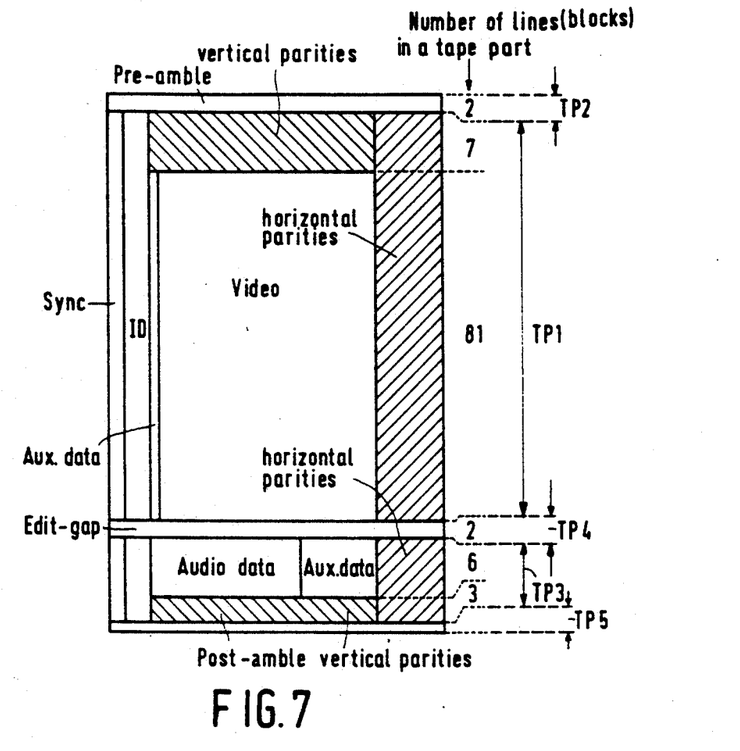
FIG. 7 shows the information content to be recorded in a track.

The information content in a single track will be further described hereinbelow. FIG. 7 diagrammatically shows the information content of the signal as it is recorded in a single track. The content is shown in FIG. 7 in the form of a rectangle having horizontal lines which are successively read out from left to right from top to bottom. First the content is two lines of n-bit codewords which are recorded in the second track part TP2. In this example n is equal to 25. Each line comprises 47 codewords. The total information content to be recorded in the second track part TP2 is thus 94 25-bit codewords. The information recorded in the first track part TP1, which comes after the second track part TP2, contains $(81+7=)$ 88 lines of information, each containing 47 n$(=25)$-bit channel words. The first track part TP1 is followed by the fourth track part TP4 (the edit gap). In the fourth track part as in the first track part two lines of 47 n $(=25)$-bit codewords each are recorded. In the track part TP3 which follows the fourth track part, information is recorded which is present in $(6+3=)$ 9 lines, each line containing again 47 n $(=25)$-bit channel words. In the fifth and last track part TP5 of the track also n $(=25)$-bit codewords are recorded. For the 625 line system, this fifth track part accommodates 1325 bits, that is to say, exactly 53 codewords. For the 525 line system, the fifth track part accommodates 1445 bits. This means 57 complete 25-bit codewords and another 20 first bits of an additional codeword. The reason for choosing the content of the fifth track part in above manner will be explained below.

In the track parts TP2, TP4 and TP5, n-bit first codewords containing at least successive sequences of p "zeros", q "ones" and r "zeros", or alternatively, p "ones", q "zeros" and r "ones" are recorded. p q and r are odd integers for which holds $p \geq 3$, $q \geq 3$ and $r \geq 3$.

From the description with respect to FIGS. 1a–1d, 2a–2c, 3a–3c, 4a–4c and 5a–5c, it has become manifest that with these codewords a PR1 detection and a PR4 detection of the information read from the second track parts is possible. Various possibilities for the first codeword will be further discussed.

The first codeword may be as follows $(p=q=r=3)$.

000111000...

A 25-bit first codeword could then look as follows:

0001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110001110

0001110001110001110001110001110001110001110001110001110001110001110001110001110001110001110001110001110001110001110001110001110

0001110001110001110001110

0001110001110001110001110001110001110001110001110001110001110001110001110

The fact that now at the end of the codeword or somewhere else in the codeword four "ones" or rather four "zeros" are found in a row is no objection for the PR1 detection and PR4 detection.

The first codeword may also look as follows $(p=q=r=5)$...

0000011111100000...

It is not advisable to form a 25-bit first codeword only from successive sequences of five "ones" and five "zeros" because in that case there will be 10 "zeros" or 10 "ones" in a row at the transitions between successive first codewords, which is undesirable for several reasons, for example, the poorer bit clock extraction.

Another possibility is a combination of sequences of 3 "ones" and sequences of 5 "zeros" or the other way around, such as

...11100011100000...

As a special exemplary embodiment the first codeword with $n=25$ follows from:

0001110001110000011100011.

Recording the first codewords in the second track parts has for its object to derive the bit clock from the information read from the second track parts when the reading of the tracks is commenced. This may be realized by applying the read information to a phase-locked loop. The voltage-controlled oscillator is then controlled such that it is set to the frequency of the bit clock or a multiple thereof.

If the phase-locked loop has been locked on to, the system is locked on to the bit clock of the information read out from the second track parts. In addition, when recording the first codewords in the second track parts, there is a possibility of detecting, after the bit clock has been locked on to during the reading operation, the first codewords whose bit patterns are naturally known, so that when the second track parts are read out, the reading device may lock on to the word clock rate. The word clock for 25-bit first codewords is thus 1/25 of the bit clock. If the device is locked on to the word clock rate, a certain detection of the sync words located in the first track parts (cf. below) will be possible.

If, in addition, one wishes to employ tracking while the tracks are being read out, and thus also while the information is being read out from the second track parts, during the recording, a pilot signal may be inserted into the information to be recorded, that is to say, tracking by influencing the current digital sum value in the information to be recorded. In aforementioned Dutch Patent Application No. 90.02.772 (PHN 13.537) there is described how a pilot signal is to be inserted into the information to be recorded.

This narrows down to the fact that the current digital sum value in the data stream behaves like a carrier which has a relatively low frequency compared to the bit frequency of the information to be recorded. For affixing such a pilot signal to the information to be recorded in the second track parts too, first and second codewords are to be recorded in the second track parts, the second codewords also being n bits long, and the inverse of the first codewords. In addition, the first codeword, and thus also the second codeword, has a disparity unequal to zero.

In the preceding example for which for the first codeword $W_1$ the bit sequence

000111000111000001110011 was chosen, the disparity of the first codeword $W_1$ is equal to $-3$. The second codeword $W_2$ then has the following bit sequence

111000111000111110001100 and has a disparity of $+3$.

Figure 8A:
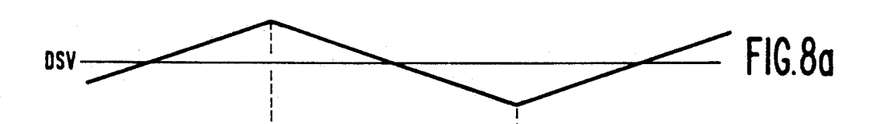
FIGS. 8a–8c show the sequence of the first and second codewords to obtain a pilot signal in the information to be recorded.
Figure 8B:
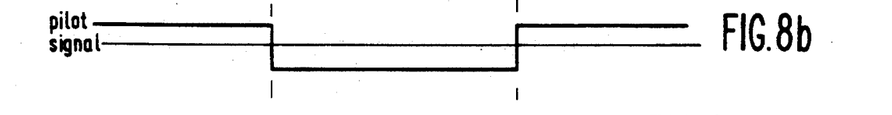
Figure 8C:
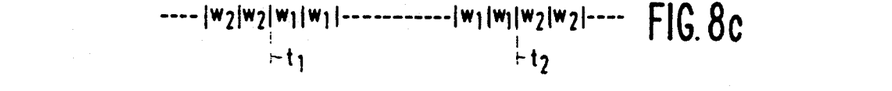

FIGS. 8a–8c show in FIG. 8b the pilot signal plotted against time as it may be affixed to the signal to be recorded in the second track parts. In order to realize this, the first and second codewords are to be placed behind one another so that the pilot signal concerned as shown in FIG. 8b is obtained. FIG. 8c shows the order of the first and second codewords plotted against time, as they are to be recorded in the second track parts. For the instant $t_1$, always second codewords $W_2$ having a positive disparity are recorded in the track. The current digital sum value thus continues to augment, cf. FIG. 8a, until, at instant $t_1$, the maximum in the signal of FIG. 8a is attained. At that instant, the first codewords $W_1$ are affixed. These codewords $W_1$ have a negative disparity. The current digital sum value is thus reduced until, at the instant $t_2$, the minimum in the signal of FIG. 8a is attained. Then again second codewords are affixed.

In the tracks which are to accommodate a pilot signal, a sequence of first and a sequence of second codewords are alternately recorded in the second track parts of these tracks, and in tracks which do not need to accommodate a pilot signal, it would be sufficient to record, for example, three "zeros", three "ones", three "zeros"... and so on in an alternating fashion. Preferably, alternating first and second codewords are taken $W_1$, $W_2$, $W_1$, $W_2$, ....

The fourth track part TP4 (edit gap) and the fifth track part TP5 in a track are preferably filled with the same type of information as that which fills the second track part TP2 of the same track. The edit gap TP4 is introduced to enable separate editing of the audio signal in the track part TP3. If the audio signal has been edited, this implies that the bit patterns in the edit gap no longer continue undisturbed. With a consecutive reproduction of the video signal and the edited audio signal, this lack of continuation of the bit patterns in the edit gap could lead to an unlocking of the reproduction system. By introducing the same codewords in the edit gap as in the second track part, the system can be locked on to very fast again.

Figure 9:
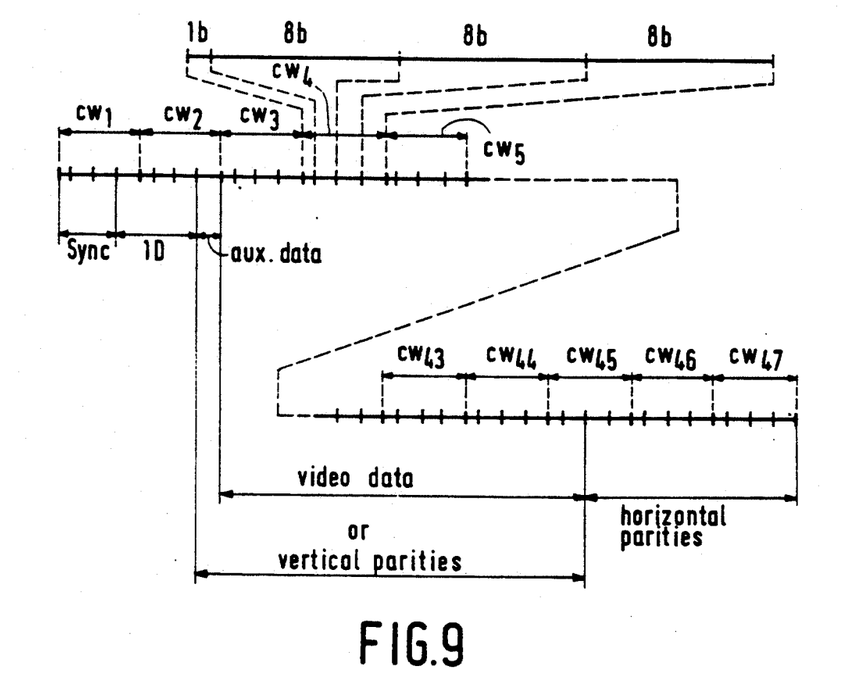
FIGS. 9 and 10 show the information content of the sync block.

The first track part TP1 in a track contains the video information FIG. 9 represents the content of a sync block recorded in the first track part of a track. A sync block is actually a horizontal line shown in FIG. 7 within the part referenced TP1.

As observed hereinbefore, this line (this sync block) contains 47 channel words each containing (in this case) 25 bits, referenced $cw_1$, $cw_2$, ... $cw_{46}$, $cw_{47}$. Each 25-bit channel word actually comprises four parts, that is to say, three uniform parts which are 8 bits long and one 1-bit-long part, as is shown in FIG. 9 for $cw_4$.

Aforementioned Dutch Patent Application No. 90.02.772 (PHN 13.537) describes how these 25-bit channel words are obtained by combining, each time, three 8-bit video information words into a 24-bit information word after which a single bit is affixed to influence the current digital sum value in the serial information of the consecutive 25-bit information words, aimed at inserting, for example, a pilot signal into this information stream. Another possibility is to realize a dip in the frequency spectrum of the information stream at a specific frequency.

Subsequently, the 25-bit information words are converted into 25-bit channel words in a 2T precoder, after which they are recorded on the magnetic record carrier.

The first channel word $cw_1$ in each line (each sync block) comprises the sync word. The sync word is formed by the first 17 bits in the first channel word $cw_1$. Including the sync word in a 25-bit information word and precoding this 25-bit information word into a 25-bit channel word is also described in aforementioned Dutch Patent Application No. 90.02.772 (PHN 13.537) which may be considered to be included in this application.

Thereafter, identification information ID is included in the last 8 bits of the first channel word $cw_1$ and the bits 2 to 17 of the second channel word $cw_2$. The identification information ID contains, for example, a track number (4 bits) denoting in which of the 10 or 12 tracks of a video frame the information is stored, a frame number (2 bits) denoting a specific video frame, and a 1-bit word denoting whether the data in the sync block are audio or video data.

Furthermore, the identification information contains a line number denoting a horizontal line in the part of the rectangle shown in FIG. 7 referenced TP1 or TP2. The line numbers run from 1 to 97 so that all the lines (all the sync blocks) in the first and third track parts are identified. 7 bits are available for the line numbering. 8 bits form a parity byte for the identification information and two bits are idle.

A sync block having a line number greater than 7 further includes an 8-bit word containing auxiliary data. For auxiliary data one may think of character data (tables of contents), check data (indication whether 50 or 60 Hz video signals are concerned, indication of the sampling rate of the audio signals) or teletext data. The two channel words $cw_1$ and $cw_2$ in a line (sync block) are now exactly filled. The sync block further includes the channel words $cw_3$ to $cw_{44}$. These channel words contain ($42 \times 3 =$) 126 8-bit video words.

The bits 2 to 9 of the channel word $cw_{45}$ also form an 8-bit video word. Thus, a sync block accommodates 127 8-bit video words (i.e. 127 video bytes). A sync block further accommodates the bits 10 to 25 of the channel word $cw_{45}$ and the channel words $cw_{46}$ and $cw_{47}$. This information comprises the horizontal parities.

If a line (sync block) in the part TP1 is concerned having a line number smaller than 8, the line part from bit 18 of the channel word $cw_2$ to the bit 9 of channel word $cw_{45}$ comprises the vertical parities in lieu of the auxiliary data and the video information.

The horizontal and vertical parities are affixed for recording the video information so as to enable an error correction of the read-out video information.

Figure 10:
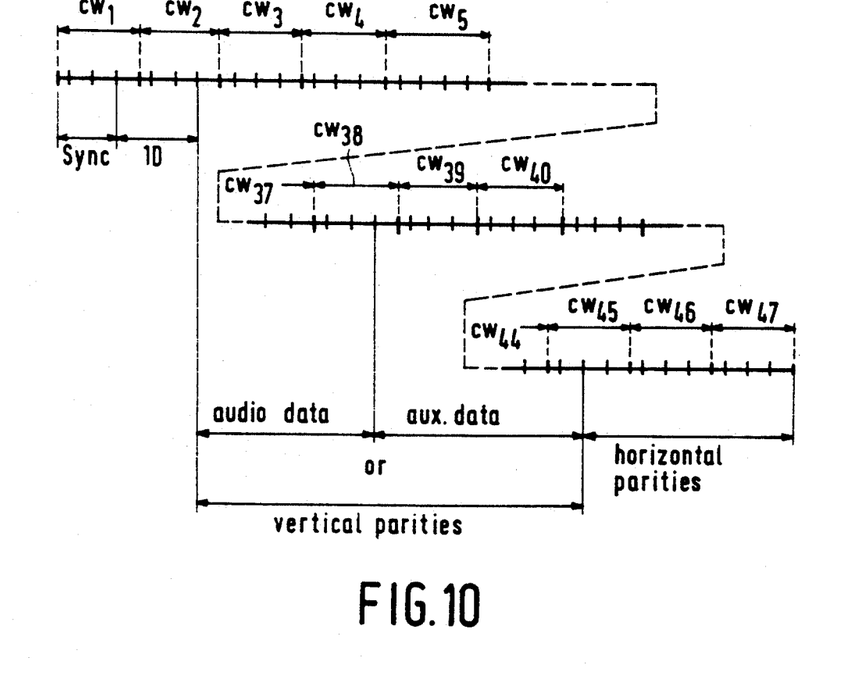

FIG. 10 shows the content of a line (sync block), which is recorded in a third track part of a track. Actually a sync block is again a horizontal line shown in FIG. 7 located within the part referenced TP3.

The lines again all contain the sync information and the identification information as already discussed hereinbefore. The last 8 bits of the channel word $cw_2$, the channel words $cw_3$ to $cw_{37}$ and the bits 2 to 17 of the channel word 38 contain audio information corresponding to a total of 108 ($=3\times 35+3$) 8-bit audio words (i.e. 108 audio bytes). The last 8 bits of the channel word $cw_{38}$, the channel words $cw_{39}$ to $cw_{44}$ and the bits 2 to 9 of the channel words $cw_{45}$ contain auxiliary data information corresponding to a total of 20 ($=3\times 6+2$) 8-bit data words (i.e. 20 data bytes. This auxiliary data information is largely identical with the auxiliary data information in the first track part.

Furthermore, from bit 10 in the channel word $cw_{45}$ the horizontal parities are included as was described with reference to FIG. 9.

The aforementioned content applies to these six lines in the part TP3. For the remaining three lines in the part TP3, it holds that the vertical parities are included in a line in lieu of the audio bytes and the auxiliary data bytes. The horizontal and vertical parities are again added for enabling an error correction of the audio information and auxiliary data that have been read out.

Figure 11:
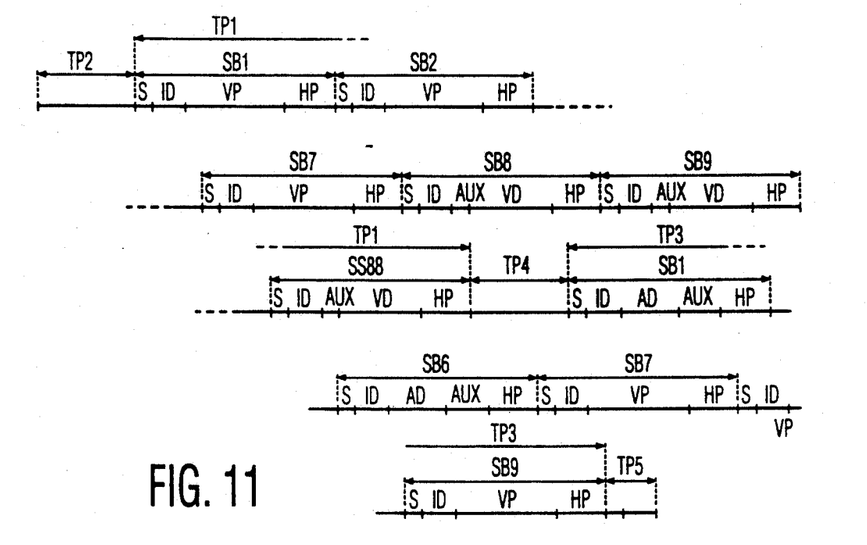
FIG. 11 gives a different representation of the information content to be recorded in a track.

FIG. 11 shows, once more in a diagrammatic form, the serial data stream which is recorded in a track. Initially the first and/or second codewords recorded in the second track part TP2. Then the information recorded in the first track part TP1. First the sync blocks $SB_1$ to $SB_7$ containing the vertical and horizontal parities, referenced VP and HP, respectively, in addition to the sync words (S) and the identification information (ID). Then the sync blocks $SB_8$ to $SB_{88}$ containing the auxiliary information (Aux) and the video information (VD) in lieu of the vertical parities. Finally, the first and/or second codewords which are recorded in the fourth part TP4.

Then comes the information which is recorded in the third track part TP3 First the sync blocks $SB_1$ to $SB_6$ which contain the audio information (AD), the auxiliary information (Aux) and the horizontal parities (HP) in addition to the sync words (S) and the identification information (ID). Then the sync blocks $SB_7$, $SB_8$ and $SB_9$ which contain the vertical parities (VP) in lieu of the audio and auxiliary information. Finally, the first and/or second codewords are recorded in the fifth track part TP5.

The reason for the vertical parities for the video information to be located up front in the track, i.e. before the video information in the track, is the following.

One reason is that trick modes should be possible when the information recorded on the record carrier is read out. In trick modes, the record carrier has a different transport speed than the transport speed with normal reproduction. At this different (higher or just lower) transport speed the read heads (read head) trace(s) a path which is not parallel with the tracks, and, consequently, crosses the tracks. In a time interval during which a read head is located over a track during the trick mode, the read head reads one or a plurality of (by far not all of the) sync blocks containing video information from this track. Each sync block comprises, where it is a matter of a sync block in the first track part, for example, the video information and the horizontal parities. These horizontal parities are intended for an error correction of the auxiliary data and the video data in the sync block. For the reading in a trick mode and thus for the reading of the information contained in a sync block, an error correction is possible on the grounds of the horizontal polarity information included in this sync block that has been read out.

The vertical parities are intended to apply an error correction to a column of bits in the rectangle shown in FIG. 7. For this purpose it is necessary for all these bits in the column to be read out. As explained hereinbefore, by far not all the sync blocks of a track are read out in a trick mode. This means that generally in a trick mode, not all the information in a column in the rectangle of FIG. 7 is read out. This also means that in the trick mode the vertical parity information cannot be used for realizing an error correction of the information read from the tracks.

The reading of the vertical parity information in a trick mode is in fact not very useful. It is more useful to permit the read head reading as many sync blocks containing desired video information as possible while it traces a path over the record carrier.

Therefore, the desired information is recorded as much as possible in the center of the record carrier and the vertical parity information as much as possible on the sides. For the case where the video information has been recorded ahead of the audio information in a track, this means that the vertical parities belonging to video information are recorded before the video information, and the vertical parities belonging to the audio information are recorded after the audio information in the track.

Needless to observe that if the audio information had been recorded in a track before the video information, the vertical parity information belonging to the audio information would be recorded in the track ahead of the audio information and the vertical parity information belonging to the video information after the video information.

Furthermore, the fact is that with normal reproduction, errors may rather occur when information is read out at the ends of a track, that is to say, on the sides of the record carrier. By recording the video and audio information more to the center of the track, seen in longitudinal direction of the track, the chance of reading useful information (represented by the horizontal parities) will be enhanced.

Figure 12:
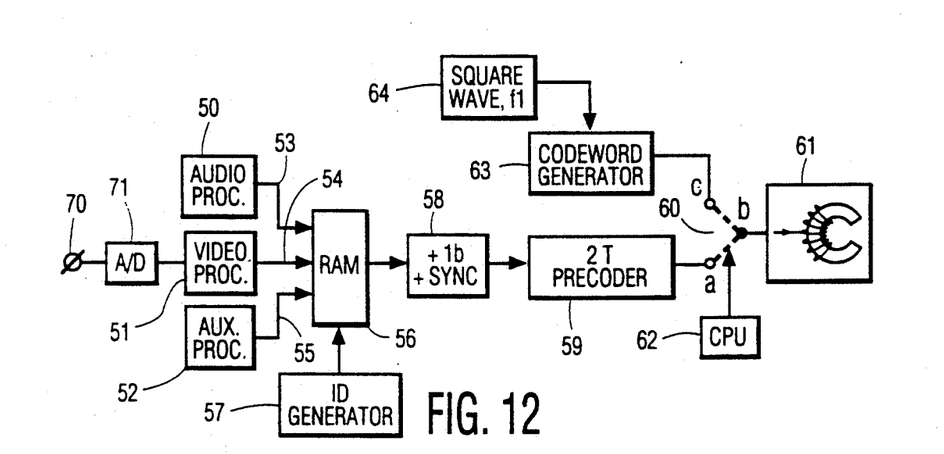
FIG. 12 shows the recording arrangement according to the invention.

FIG. 12 shows an example of an arrangement for recording audio, video and auxiliary information in the tracks.

In an audio signal processing unit 50, the audion signal, for example, a stereo audio signal, is converted from 8-bit audio words (audio bytes) which are applied to a memory 56 over the line 53.

Figure 13:
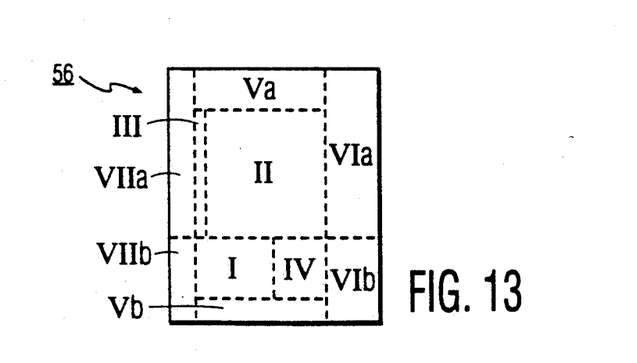
FIG. 13 shows the content of the memory in the arrangement shown in FIG. 12.

FIG. 13 diagrammatically shows the subdivision of the contents of this memory 56. In the memory section referenced I, these audio bytes (6 lines of 108 audio bytes in all) are stored.

In a video signal processing unit 51, the video signal, after being subjected to a picture encoding to reduce the amount of information, is converted to 8-bit video words (video bytes) which are applied to the memory 56 over the line 54. In the memory section referenced II, these video bytes are stored (a total of 81 lines of 127 video bytes).

In an auxiliary signal processor 52 the auxiliary signal is converted to 8-bit auxiliary data words (aux bytes). Over line 55 these bytes are applied to the memory 56 where they are stored in the sections referenced III and IV. In section III 1, auxiliary byte is stored in each of the 81 lines. Section IV accommodates a total 6 lines of 20 auxiliary bytes each.

Thereafter, an error protection operation is performed for the information stored in the sections II and III. This results in the vertical parities being stored in the section Va and the horizontal parities being stored in the section VIa. First, an error protection operation is performed column-by-column for the information stored in each column in the sections II and III. This provides the vertical parity information stored in a corresponding column in the section Va. After completing the operation for all the columns in the memory sections II and III in this fashion, an error protection operation is performed line-by-line for the information stored in each line in the sections II, III and Va. This then provides the horizontal parity information stored in the corresponding line in the section VIa.

With the horizontal parity information stored in a line of the section VIa and the information stored in the same line of the memory sections II and III, it is possible on reproduction to detect and correct, as required, errors occurring in this combined line of memory sections II, III and VIa.

With the vertical parity information stored in a column in the section Va and the information stored in the same column in the memory section II (or III), it is possible on reproduction to detect and correct, as required, errors in this combined column of the memory sections II (or III) and Va. An error protection operation is also performed for the information stored in sections I and IV. The result is the vertical parities being stored in section Vb and the horizontal parities being stored in section VIb.

Also in this case, an error protection operation is performed for the information stored in each column in the sections I and IV. This provides the vertical parity information stored in a corresponding column in the memory section Vb. After all the columns in the memory sections I and IV have been processed in this manner, a line-by-line error protection operation is performed for the information stored in each line in the sections I, IV and Vb. This provides the horizontal parity information stored in a corresponding line in the section VIb.

Furthermore, the ID generator 57 provides the identification information stored in the sections VIIa and VIIb. In the section VIIa, there are 88 lines of 3 ID bytes each and in the section VIIb there are 9 lines of 3 ID bytes each.

Thereafter, the memory 56 is read out line-by-line and the values which may have been scrambled in a scrambler (not shown) are applied to the unit 58. This implies that bytes are each time applied to the unit 58.

In Dutch Patent Application No. 90.02.772 (PHN 13.537), the operation of the unit 58 and the 2T precoder 59 is extensively discussed. For an explanation of this operation reference is made to that Patent Application.

It will be sufficient to observe in this connection that, each time, three 8-bit words applied by memory 56 to unit 58 are converted to single 25-bit information words in unit 58 as a result of the extension by one bit (either a "0" or a "1"). In the 2T precoder 59 the 25-bit information words are converted to 25-bit channel words which are then applied to the recording device 61 when the switch 60 is in the position a-b. The channel words are recorded on the record carrier by the recording device 61.

Prior to the reading of the information from the memory 56, a switch 60 is put in position c-b in response to a control signal applied to switch 60 by a central processing unit.

The arrangement comprises a codeword generator 63 devised for generating the first and possibly second codewords. If a pilot signal having frequency $f_1$ is meant to be inserted into the information to be recorded in the second track parts TP2, the generator 63 is to generate the first and second codewords in an alternating fashion as has already been explained with reference to FIGS. 8a–8c in response to a control signal in the form of a square wave having frequency $f_1$ generated by a control signal generator 64.

The switch 60 retains position c-b until the generator 63 has delivered 94 25-bit codewords to the recording device 61. Then the switch 60 changes to the position a-b. Subsequently, in unit 58, the sync word and the first byte of the first line in the memory 56 are combined for forming the first 25-bit information word to be applied to the recording device 61 after 2T precoding. Inserting the sync word into the serial data stream as is realized by the unit 58 is again extensively discussed in aforementioned Dutch Patent Application No. 90.02.772 (PHN 13.537).

Thereafter, the remaining bytes stored in the first line of the memory 56 are combined in groups of 3 and converted to 25-bit information words in the unit 58, and after being subjected to precoding in the 2T precoder 59, recoded in the track of the record carrier.

Subsequently, in unit 58, the sync word and the first byte of the second line in the memory 56 are combined to form the next 25-bit information word to be applied to the recording device 61 after precoding in the precoder 59. Then, 3 bytes are stored each time in the second line of the memory 56, combined and converted to a 25-bit information word in the unit 58. This operation is continued until the entire second line of the memory 56 has been read out. This operation is repeated for successive lines of memory 56 until the 88th line of the memory 56 has been read out. The information stored in the memory sections II, III, Va, VIa and VIIa has now been read from the memory 56 and recorded in the track on the record carrier, that is to say, in the first track part TP1.

The switch 60 now changes back to the position c-b. The codeword generator 63 again generates 94 codewords (first and possibly second codewords) which are recorded in the track by the recording device 61 and form the fourth track part.

Subsequently, the switch 60 returns to the position a-b. In the manner described hereinbefore, the rest of the information stored in the memory 56 is read out and is recorded in the track, after the sync information is added, and after the further processing in the unit 58 and the precoder 59 has taken place. In this fashion, the third track part is developed. Then again the switch 60 returns to the position c-b and another 47 codewords are applied to the recording device 61 by the generator 63 and recorded in the track, so as to form the fifth track part.

It should be observed here that the steps described hereinbefore are realized in response to control signals applied to the various constituent parts in the arrangement shown in FIG. 13 by a central processing unit, for example, the processing unit 62.

For simplicity and clarity of the description these control signals will not be discussed any further.

The foregoing describes that the fifth track part TP5 contains 1325 or 1445 bits depending on whether a 50 Hz-625 line system or a 60 Hz-525 line system is concerned. The reason for this is that this measure achieves a simple coupling between the clock frequency $f_1$ with which a video signal presented to an input 70 of the arrangement is to be sampled in an analog-to-digital converter 71 prior to the signal being applied to the video signal processing unit 51, and the frequency $f_2$ with which a recording head records the digital information on the record carrier (the channel bit rate).

When taking the 50 Hz-625 line system as an example, it holds that $f_1 = 864 \times 625 \times 25 = 13.5$ MHz, where 864 stands for the number of clock pulses in one video line, 625 for the number of lines in a frame and 25 for the number of frames per second.

For the channel bit rate $f_2$ it holds that there are $(47 \times 101 \times 25 + 1325 =)$ 120,000 bits in a single track.

The channel bit rate $f_2$ for a single head is then $120,000 \times 300/2 = 18$ Mbit/s, where 300 is the number of tracks recorded per second.

There is a simple 4/3 ratio between $f_1$ and $f_2$. A phase-locked loop (not shown) which is also supplied with the video signal applied to the input 70, derives the 13.5 MHz clock rate from this video signal. When multiplying this rate by 4/3, the 18 MHz clock rate is obtained which is necessary in recording unit 61 for recording the digital information in the record carrier.

I claim:

1. Arrangement for recording a digital signal in tracks on a magnetic record carrier, said tracks running parallel with each other over said record carrier and at an angle relative to the longitudinal axis of said record carrier, while the digital signal is recorded in a first track part of the tracks, said arrangement comprising an input terminal for receiving the digital signal, and recording means for recording the digital signal in the first track part, characterized in that the arrangement further comprises codeword generating means for generating n-bit first codewords, and in that the recording means is arranged for recording the n-bit first codewords in second track parts which form the beginning of the tracks, in that the first codewords each contain a sequence of, successively, p bits having a first binary value, q bits having a second binary value being the inverse binary value of the first binary value, and r bits having the first binary value, and in that p, q and r are odd integers for which the following holds $p \geq 3$, $q \geq 3$, and $r \geq 3$.

2. Arrangement as claimed in claim 1, characterized in that the arrangement is furthermore arranged for generating n-bit second codewords and for recording the second codewords in the second track parts, and in that the second codewords are the inverse codewords of the first codewords.

3. Arrangement as claimed in claim 1, characterized in that r is equal to p.

4. Arrangement as claimed in claim 3, characterized in that the first codewords contain a sequence of successive p bits having the first binary value, q bits having the second binary value, p bits having the first binary value and again q bits having the second binary value.

5. Arrangement as claimed in claim 1, characterized in that the first codewords additionally contain p+2 successive bits of the first binary value.

6. Arrangement as claimed in claim 1, characterized in that the first codewords additionally contain q+2 successive bits of the second binary value.

7. Arrangement as claimed in claim 1, characterized in that p, q and r are equal to 3 or 5.

8. Arrangement as claimed in claim 2, characterized in that for generating a pilot signal in the information recorded in the second track parts, said pilot signal consisting of a carrier having a relatively low frequency with respect to the frequency of the recorded information, the arrangement is arranged for alternately recording the first codewords and the second codewords in the second track parts so that the mean value of the recorded information in essence varies with the variation of the relatively low-frequency carrier.

9. Arrangement as claimed in claim 8, characterized in that for this purpose the disparity of the first and second codewords is unequal to zero.

10. Arrangement as claimed in claim 1, characterized in that n=25.

11. Arrangement as claimed in claim 10, characterized in that the first codeword is equal to the 25-bit binary number "0001110001110000011100011".

* * * * *